United States Patent [19]

Stranger et al.

[11] Patent Number: 4,830,566
[45] Date of Patent: May 16, 1989

[54] VEHICLE WITH LOADING DEVICE

[75] Inventors: Edgar P. Stranger, Guernsey, Channel Islands; John A. Mahy, Houmet Vale, Great Britain

[73] Assignee: Worldwide Trucks Limited, Guernsey, United Kingdom

[21] Appl. No.: 584,257
[22] PCT Filed: May 9, 1983
[86] PCT No.: PCT/GB83/00135
§ 371 Date: Jan. 10, 1984
§ 102(e) Date: Jan. 10, 1984
[87] PCT Pub. No.: WO83/04006
PCT Pub. Date: Nov. 24, 1983

[30] Foreign Application Priority Data

May 10, 1982 [GB] United Kingdom ............... 8213423

[51] Int. Cl.$^4$ .................................................. B60P 1/64
[52] U.S. Cl. .................................................... 414/546
[58] Field of Search .................. 414/498, 546; 212/256, 212/258, 259, 261, 265

[56] References Cited

U.S. PATENT DOCUMENTS

| 2,971,661 | 2/1961 | Isaacs, Jr. | 414/546 |
| 3,239,080 | 3/1966 | Corompt | 212/261 X |
| 3,458,066 | 7/1969 | Klaus | 414/546 |
| 3,603,464 | 9/1971 | Teodorescu | 414/546 |
| 3,958,702 | 5/1976 | Hand | 414/347 |
| 4,019,642 | 4/1977 | Hammar | 414/546 |

FOREIGN PATENT DOCUMENTS

| 0029208 | 5/1981 | European Pat. Off. |
| 1254634 | 1/1961 | France . |
| 1210775 | 10/1970 | United Kingdom . |

Primary Examiner—Frank E. Werner
Assistant Examiner—David A. Bucci
Attorney, Agent, or Firm—Cushman, Darby & Cushman

[57] ABSTRACT

An elongated platform vehicle, such as an articulated trailer, has two gantries (14; 15) spaced fore and aft within the length of a load-receiving platform (2, 3, 4), each gantry (14; 15) having an L-shaped transverse main bearer (16, 17) with one arm (16) lying, when in stowed position, level with or below the load-receiving platform (2, 3, 4), the other arm (17) extending upwardly at one side of the platform and carrying a jib arm (21) having a lifting cradle (24, 25). The L-shaped main bearers (16, 17) are raisable and lowerable in unison about longitudinal pivot axes (18) with respect to the platform, and the jib arms (21) are movable in unison about longitudinal axes (20) with respect to the L-shaped main bearers (16,17), such that a load (35) may be transferred between a position at one side of the platform, and a position on the platform. A removable pallet (4) may form an intermediate portion of the load-receiving platform. Laterally extendible stablizer arms (10), provided with jacks (8,11), may be provided at spaced positions on the vehicle.

9 Claims, 3 Drawing Sheets

VEHICLE WITH LOADING DEVICE

This invention relates to a vehicle incorporating its own means for lifting and lowering a load and moving the load laterally of the vehicle, for loading and unloading purposes. Whilst not restricted thereto, it is particularly applicable to the loading and unloading of International Containers.

The object of the invention is to provide an improved vehicle in which the loading means, when in stowed condition, leaves the load-receiving surface of the vehicle substantially unencumbered, such that the load-receiving surface may accommodate loads which extend beyond the loading means, in the logitudinal direction of the load-receiving surface, and may shift such loads from and onto the load-receiving surface at one side of the vehicle.

According to the present invention a vehicle comprises:

(a) a chassis having a load-receiving surface,
(b) a pair of gantries spaced longitudinally on the chassis, each gantry including:
  (i) a generally L-shaped two-arm cranked member having a first arm pivoted by a free end portion thereof to the chassis for movement about an axis disposed longitudinally of the chassis, and a second arm projecting above the chassis,
  (ii) a jib arm pivoted by one end portion to a free end portion of said second arm for movement about an axis disposed longitudinally of the chassis, and
  (iii) connecting means on the jib arm for connecting to a load,
  the cranked members being movable about their pivot into and between a stowed condition in which an upper surface of the first arm lies at or below the level of the load-receiving surface and a raised position in which the first arm extends above the level of the load-receiving surface,
(c) powered drive means for shifting the cranked members relative to the chassis into the stowed and raised positions, and
(d) powered drive means for moving each jib arm relative to the respective cranked member.

With such a construction, the lenght of the first arm of the cranked member can be of the same order as the width of the load-receiving surface, such that almost all of that width is clear of obstruction above the level of the surface, and the surface can thus receive loads which extend longitudinally beyond the two gantries.

In a preferred arrangement, each gantry has a respective powered drive means, and each jib arm has a respective powered drive means, and all of the drive means are arranged to act in unison, whereby a load may be lifted, moved laterally, and lowered, in a symmetrical manner.

Each drive means may conveniently be a hydraulic ram, and all of the rams arranged in a hydraulic feed circuit having tandem pumps each of which feeds the drive means of the cranked member and associated jib arm of a respective gantry.

The vehicle may further comprise stabiliser beam means, for example two such beams disposed one towards the front end and one towards the rear end of the vehicle. The beam means are extendible and withdrawable laterally of the chassis and have liftable and lowerable jack means thereon. The beams and the jacks have respective hydraulic drive rams included in the hydraulic feed circuit.

The chassis may include load platforms spaced longitudinally thereof, e.g. to the front of and to the rear of the respective gantries, and a removable pallet adapted to be positioned between the gantries, the platforms and the pallet having the load-receiving surface thereon.

The connecting means of each jib arm may comprise a lifting cradle on the jib arm, and means on the cradle for connecting to a bulk transport container and/or to the pallet.

The chassis may have respective locking means on it for locking both the pallet and the container to the chassis.

In a preferred embodiment, the drive means for the cranked members and the drive means for the jib arms are arranged such that in all positions of the cranked members relative to the chassis, the jib arm remains in the same position of angularity with respect to the load-receiving surface, e.g. by appropriate regulation of the extent of flow of the respective feeds of hydraulic fluid to the rams operating the cranked member and the associated jib arm.

Conveniently, the cranked members have their arms cranked substantially at 90°, and in the stowed condition the first arm is substantially parallel to the load-receiving surface whereas in the raised position it is substantially at 90° to the load-receiving surface.

An embodiment of trailer vehicle incorporating the invention is hereinafter particularly described by way of non-limiting example with reference to the accompanying drawings, wherein.

Figure 1:
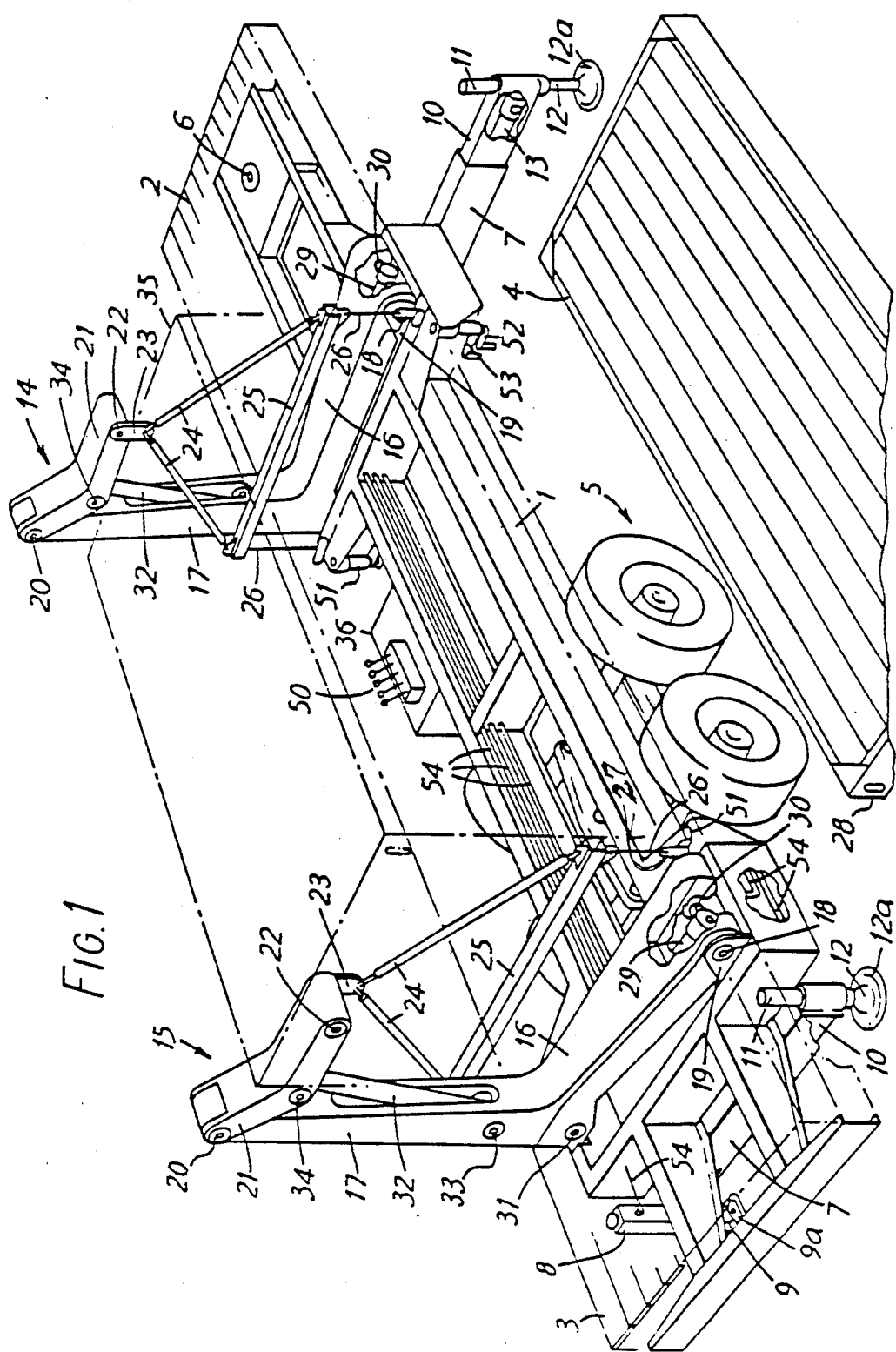
FIG. 1 is a perspective view of the trailer.

The trailer comprises a rigid chassis 1 which extends the entire legth of the trailer. On a forward portion of the chassis 1 there is a front load platform 2, and on a rear portion there is a rear load platform 3, there being between the front and rear platforms a well which can be occupied by a removable pallet 4 which then rests on the chassis 1. When the pallet 4 is in position on the chassis 1, there is formed a full-length level platform which may receive an elongated load.

The chassis 1 is supported by a conventional wheeled suspension indicated generally at 5, and at the front end by a conventional king-pin 6 to engage with the bearer plate of a tractor vehicle (not shown).

To stabilise the trailer when loading and unloading, and to support the front end when not coupled to the tractor vehicle, there are provided stabiliser jacks. The rear portion of the chassis 1 includes a cross-beam 7 having at one end a jack 8 with a vertically shiftable stem 9 carrying a foot 9a to contact the ground. The stem 9 is liftable and lowerable by a double-action hydraulic ram. In the other end of the cross-beam 7 there is slidable an extension beam 10 which carries a jack 11 having a stem 12 with a foot 12a. The stem 12 is liftable and lowerable by an internal double action hydraulic ram. An exactly similar beam 7, with two jacks 8 and 11 is provided at the front end of the chassis 1, but the jack 8 is not visible in FIG. 1. The slidable extension beam 10 is arranged to be extended and withdrawn by a double action hydraulic ram 13 (see the front end beam 7)

which is connected at one end to the beam 7 and at the other end to the ram 11. To prevent tilting of the chassis, during loading and unloading, the extension beams 10 are extended partly or fully, and the jacks 8,8 and 11,11 are extended to cause the feet 9a and 12a to contact the ground. With the extension beams 10 withdrawn to stowed position, the front end of the vehicle, or both ends if desired, may be supported on the rams, which may be mechanically locked, e.g. as by a removable transverse pin, if desired.

On the chassis 1 there are mounted a front end gantry indicated generally at 14, and a rear end gantry indicated generally at 15. Each gantry comprises a rigid L-shaped main bearer having a first arm 16 and a second arm 17 at a right angle thereto. In the stowed position, seen in FIG. 1, the first arm 16 of each gantry is horizontal and lies in a well so that the upper surface of the arm 16 is slightly below the general plane of the upper surface of the platforms 2 and 3. The free end of the arm 16 is coupled by a horizontal longitudinal pivot 18 to a pair of brackets 19 on the chassis 1. At the free end of the arm 17 there is a horizontal longitudinal pivot 20 to which is coupled a jib arm 21 overlying the first arm 16. At the free end of the jib arm 21 there is a horizontal longitudinal pivot 22 carrying a connector 23 of a loading cradle having tie bars 24 supporting a crossbar 25 provided at each end with chains or cables 26 having a coupling element 27 for engagement with a counterpart element (not shown) of a conventional bulk transport container, or with an opening 28 at the corners of the pallet 4.

For shifting the L-shaped main bearer 14 or 15 there is provided a double acting hydraulic ram 29 pivoted at one end on a cross-shaft 30 secured in the chassis 1, and coupled to a cross-shaft 31 at the elbow of the main bearer. For shifting of the jib arm 21 with respect to the arm 17 there is provided a double acting hydraulic ram 32 pivoted at its lower end on a cross-shaft 33 on the arm 17, and coupled at its upper end to a cross-shaft 34 at the elbow of the jib arm 21.

Figure 2:
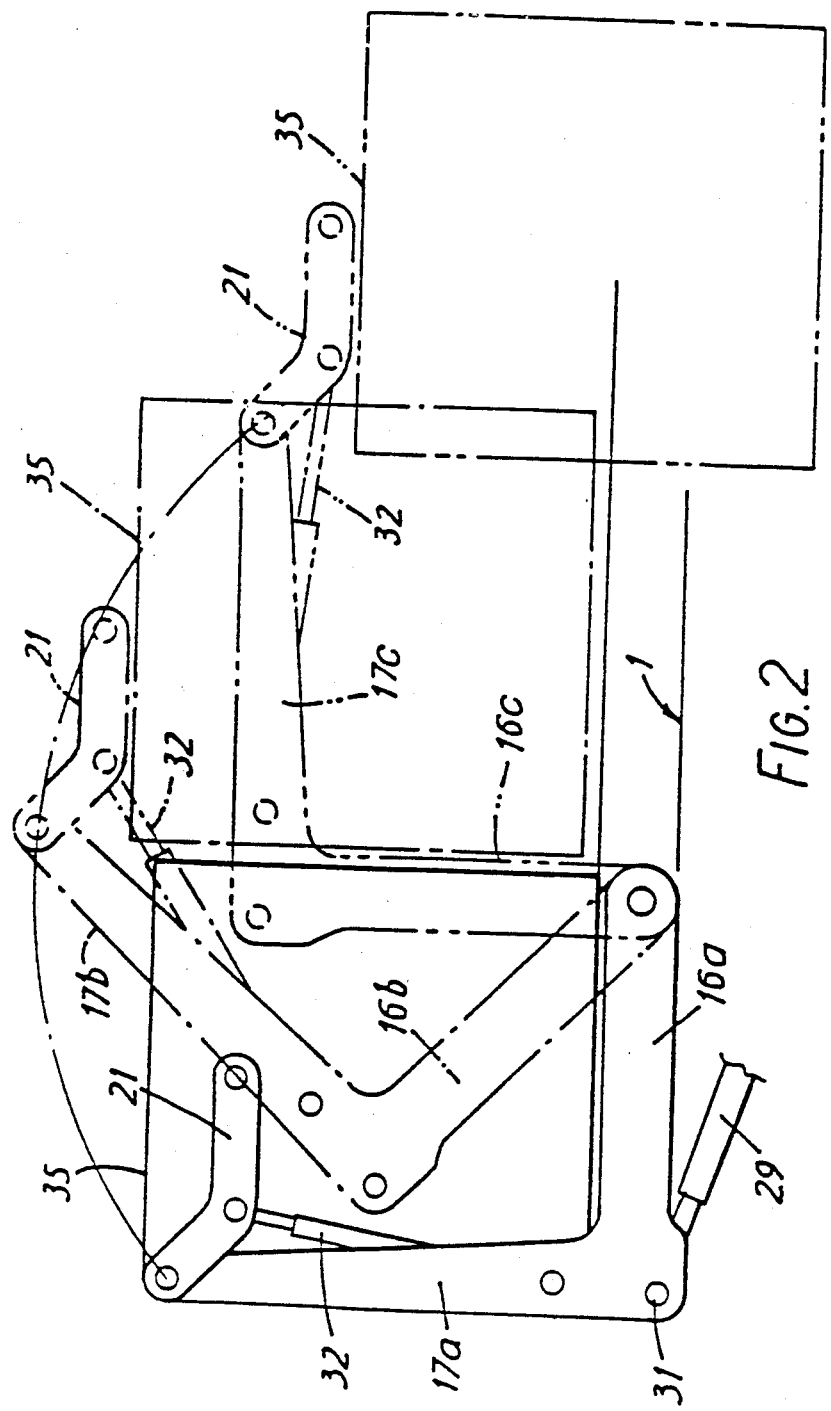
FIG. 2 is a schematic elevation of one of a pair of gantries, to show stowed, half-extended, and fully-extended positions thereof.

Referring now to FIG. 2, the main bearer 14 is shown in three positions of pivoting about its pivot 18. The action is identical for the main bearer 15. References 16a, 17a indicate the position of the main bearer in stowed condition. References 16b, 17b show it in an intermediate position of loading or unloading. References 16c, 17c show it in a position of full lateral extension for raising or lowering a load with respect to the ground at one side of the chassis 1. The load is here represented by a bulk transport container 35 indicated in broken line. In each position of the main bearer, the jib arm 21 is maintained in the same position of angularity relative to the chassis 1.

There are two hydraulic rams included in each gantry, and three hydraulic rams included on each of the stabiliser beams 7. All of these hydraulic rams are operated by a hydraulic pump system driven by a diesel engine 36 mounted on one side of the chassis 1 in a casing with hydraulic pumps and operator controls described with reference to FIG. 3. Alternatively, the hydraulic system could be coupled to the usual hydraulic system of the tractor vehicle (not shown).

Figure 3:
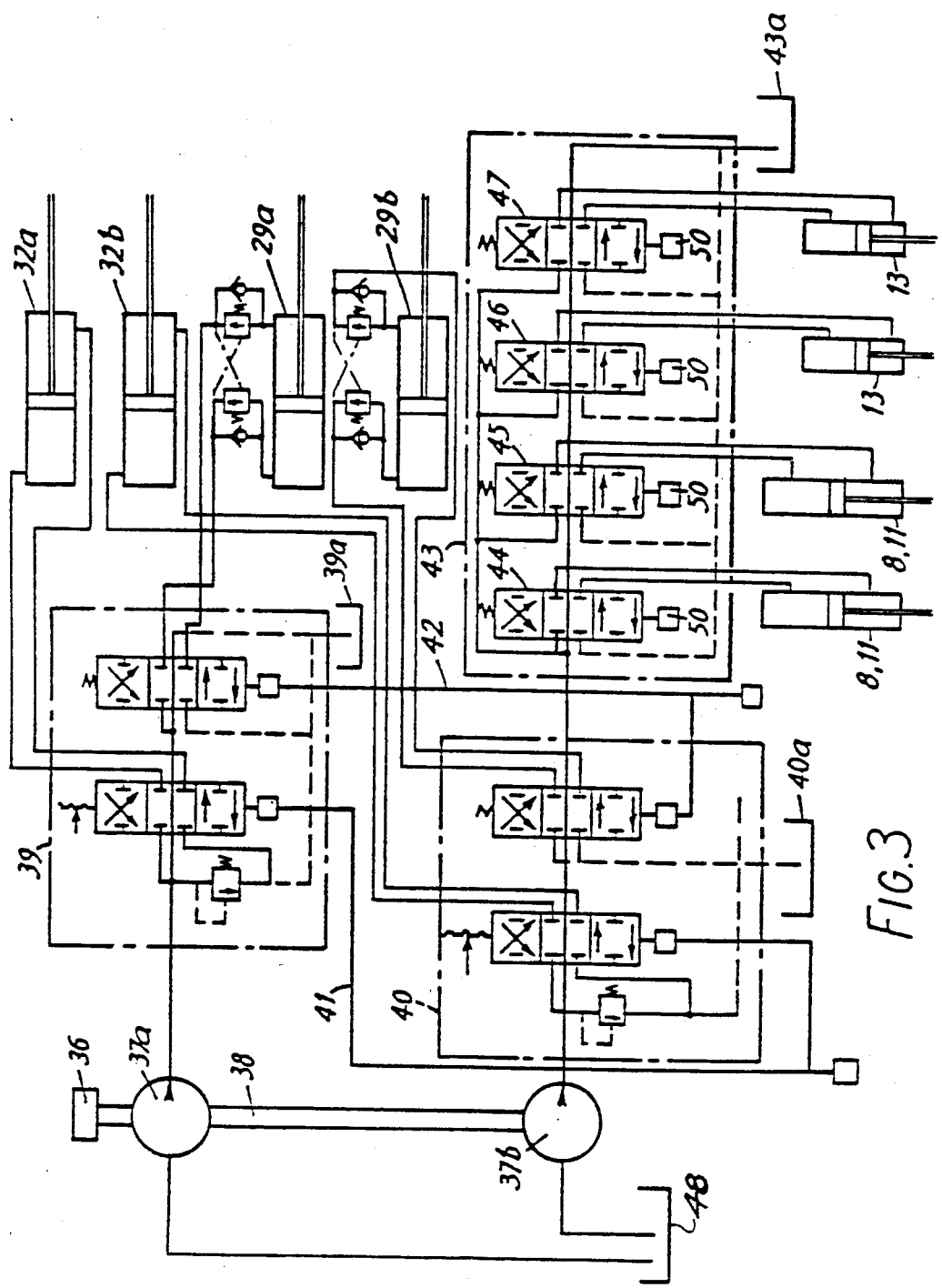
FIG. 3 is a diagram of a hydraulic system for operation of rams of the gantries, and rams of means for stabilising the trailer.

The hydraulic system is shown in detail in FIG. 3.

There is provided a respective metering pump 37a or 37b for each of the gantries 14 and 15. The pumps have a common drive shaft 38 driven by engine 36. A first spool valve assembly, enclosed within a brokenline frame 39, controls feed of hydraulic fluid from pump 37a to ram 29a for, say, gantry 14 and to jib arm ram 32a thereof, and a second similar spool valve assembly, enclosed within the broken-line frame 40 controls feed of hydraulic fluid from pump 37b to ram 29b and jib arm ram 32b of gantry 15. The pumps 37a, 37b are identical and have a common drive so that lifting rams 29a, 29b are operated in unison, and rams 32a, 32b are also operated in unison, thus ensuring that the lifting and lowering of the load is always symmetrical.

The flow of fluid to and from the jib rams 32a, 32b is proportioned to ensure that the jibs 21 remain horizontal. Lines 41,42 indicate that operator-actuated controls of corresponding first and second spools of the two valve assemblies are mechanically ganged for simultaneous and identical operation.

Enclosed within a broken-line frame 43 is a third valve assembly having spool valves 44,45,46,47 all fed from pump 37b. Valves 44,45 feed the rams 8 and 11 respectively of the front and rear stabiliser jacks, and valves 46,47 feed the rams 13 respectively of the front and rear stabiliser extension beams 10. Each of the four valves is independently operable by means of a control 50 accessible to the operator. The valve assemblies 39,40,43 have been shown with respective fluid return reservoirs 39a, 40a and 43a which would in practice be common with the feed reservoir 48 of the pumps 37a 37b.

Suitable hydraulic feed lines are connected between the pumps, the operator controls and the rams. Some of these feed lines are indicated at 54 on the chassis 1, but these are only representative and not all of the feed lines of FIG. 3 have been shown in FIG. 1, to avoid lack of clarity in that figure.

With the hydraulic system under power, operation of the spool valves can be made to obtain lifting and lowering of the jacks, and extension and withdrawal of the stabiliser beams 10. Then, with the chassis 1 suitably stabilised, a load can be picked up from the ground and placed onto the chassis 1, or vice versa, by simultaneous operation of the spool valves to cause pivoting of the L-shaped main bearers 14,15, and appropriate pivoting of the jib arms 21,21 to maintain them in the position seen in FIG. 2.

The load may be a bulk transport container provided with coupling means of known kind for engagement by the lifting cradles, or the load (such as a container) may be placed on the pallet 4 which is then engaged by the lifting cradles. Where a conventional bulk transport container 35 is mounted on the pallet 4, both the pallet 4 and the container 35 itself may be secured to the chassis 1 by a double twist-lock device 51 (see FIG. 1) provided on the chassis 1 adjacent each corner of the space occupied by the pallet 4, and consisting of concentric shafts each having a radial locking tongue to engage one with the pallet and one with the container, each shaft having a respective operating handle 52,53.

When the gantries 14,15 are in the stowed position (see FIG. 2), the arms 16 do not lie above the general level of the platforms 2 and 3, and the pallet 4 if in position. Thus, the trailer can then also be used for very long loads which may even extend beyond the ends of the trailer itself, at least at the rear end. Loads such as tree trunks, steel girders or railway line lengths may be loaded and unloaded in similar manner by use of the two gantries, with care being taken to position the extendible stabiliser beams 10 at a shortened position of extension so as not to interfere with the elongated load when being lowered to the ground.

We claim:

1. A vehicle comprising
   (a) a chassis having a load-receiving surface,
   (b) a pair of gantries spaced longitudinally on the chassis, each gantry including:
      (i) a generally L-shaped two-arm cranked member having a first arm of fixed length pivoted by a free end portion thereof to the chassis for movement about an axis disposed longitudinally of the chassis and a second arm projecting above the chassis and making an angle of not more than about 90° with the first arm,
      (ii) a jib arm pivoted by one end portion to a free end portion of said second arm for movement about an axis disposed longitudinally of the chassis, and
      (iii) connecting means on the jib arm for connecting to a load, the cranked members being moveable about their pivots into and between a stowed condition in which an upper surface of the first arm lies at or below the level of the load-receiving surface and the second arm lies substantially within the zone vertically above the load receiving surface and a raised position in which the first arm extends above the level of the load-receiving surface,
   (c) powered drive means for shifting the cranked members relative to the chassis into the stowed and raised positions, and
   (d) powered drive means for moving each jib arm relative to the respective cranked member.

2. A vehicle, as claimed in claim 1, wherein each gantry has a respective drive means, and each jib arm has a respective powered drive means, and all of said drive means are arranged to act in unison.

3. A vehicle, as claimed in claim 2, wherein each drive means is a hydraulic ram, and all of said rams are arranged in a hydraulic feed circuit having tandem pumps each of which feeds the drive means of the cranked member and the drive means of the associated jib arm of a respective gantry.

4. A vehicle, as claimed in claim 3, including stabilizer beam means extendible and withdrawable laterally of the chassis and liftable and lowerable jack means and said jack means having respective hydraulic drive rams included in said hydraulic feed circuit.

5. A vehicle, as claimed in claim 1, wherein said chassis includes load platforms spaced longitudinally thereof, and a removable pallet adapted to be positioned between said gantries said platforms and said pallet having said load-receiving surface.

6. A vehicle, as claimed in claim 5, wherein said connecting means comprise a lifting cradle on the jib arm and means on said cradle for connecting a load.

7. A vehicle, as claimed in claim 5, comprising respective locking means on said chassis for locking a pallet and said container to said chassis.

8. A vehicle, as claimed in claim 1, wherein the drive means for the cranked members and the drive means for the jib arms are arranged such that in all positions of the cranked members relative to the chassis, the jib arms are constrained to remain in the same position of angularity with respect of the load-receiving surface.

9. A vehicle, as claimed in claim 1, wherein the cranked members have their arms cranked substantially at 90°, and wherein in said stowed condition said first arm is substantially parallel to said load-receiving surface, and in said raised position is substantially at 90° to said load-receiving surface.

* * * * *